United States Patent [19]

Giardini et al.

[11] 4,161,931
[45] Jul. 24, 1979

[54] VAPOR TEMPERATURE CONTROLLED EXHAUST GAS HEAT EXCHANGER

[75] Inventors: Dante S. Giardini, Dearborn Heights; Douglas R. Hamburg, Birmingham, both of Mich.

[73] Assignee: Ford Motor Company, Dearborn, Mich.

[21] Appl. No.: 884,331

[22] Filed: Mar. 7, 1978

Related U.S. Application Data

[62] Division of Ser. No. 699,004, Jun. 21, 1976, Pat. No. 4,099,499.

[51] Int. Cl.² ............................................. F02M 31/00
[52] U.S. Cl. ................................. 123/122 E; 123/133; 123/122 H
[58] Field of Search ............... 123/122 E, 122 H, 133; 261/144, 145

[56] References Cited

U.S. PATENT DOCUMENTS

| | | | |
|---|---|---|---|
| 1,889,270 | 11/1932 | Thomas | 123/122 H |
| 2,473,808 | 6/1949 | Mallory | 123/122 H |
| 3,738,334 | 6/1973 | Farr | 123/122 E |
| 3,783,841 | 1/1974 | Herschler | 123/122 E |
| 3,986,486 | 10/1976 | Rabbiosi | 123/122 H |

Primary Examiner—Ronald H. Lazarus
Attorney, Agent, or Firm—Peter Abolins; Clifford L. Sadler

[57] ABSTRACT

An exhaust gas heat exchanger for vaporizing a liquid fuel is disclosed. The exhaust gas heat exchanger includes exhaust gas flow control valve means, responsive to a vapor temperature, to control the delivery of heated exhaust gases to a heat exchanger coil. A heat exchanger housing is communicated with the exhaust gas conduit of an otherwise conventional internal combustion engine and is provided with means defining a pair of generally parallel exhaust gas flow chambers. A fluid conducting heat exchanger assembly, in the form of one or more helical coils of fluid conducting tubing, is disposed within one of said at least two chambers in the housing. The tubing communicates on an upstream end with a source of liquid fuel and communicates on a downstream end with a vapor reservoir. The heat exchanger coil is arranged to have a maximum surface to volume ratio by including a plurality of individual fluid conduits arranged in side by side relationship.

A diverter valve member is disposed within the housing body and is operative to modulate the portion of the total exhaust gas stream which passes through and over the heat exchanger coil assembly. A vacuum motor actuates the valve member between a pair of stops. The vacuum motor communicates through a vacuum valve with a source of vacuum as the internal combustion engine. The position of the vacuum valve, and hence the position of the diverter valve member, may be controlled by a temperature responsive unit which senses a vapor temperature at any desired vapor temperature location.

3 Claims, 5 Drawing Figures

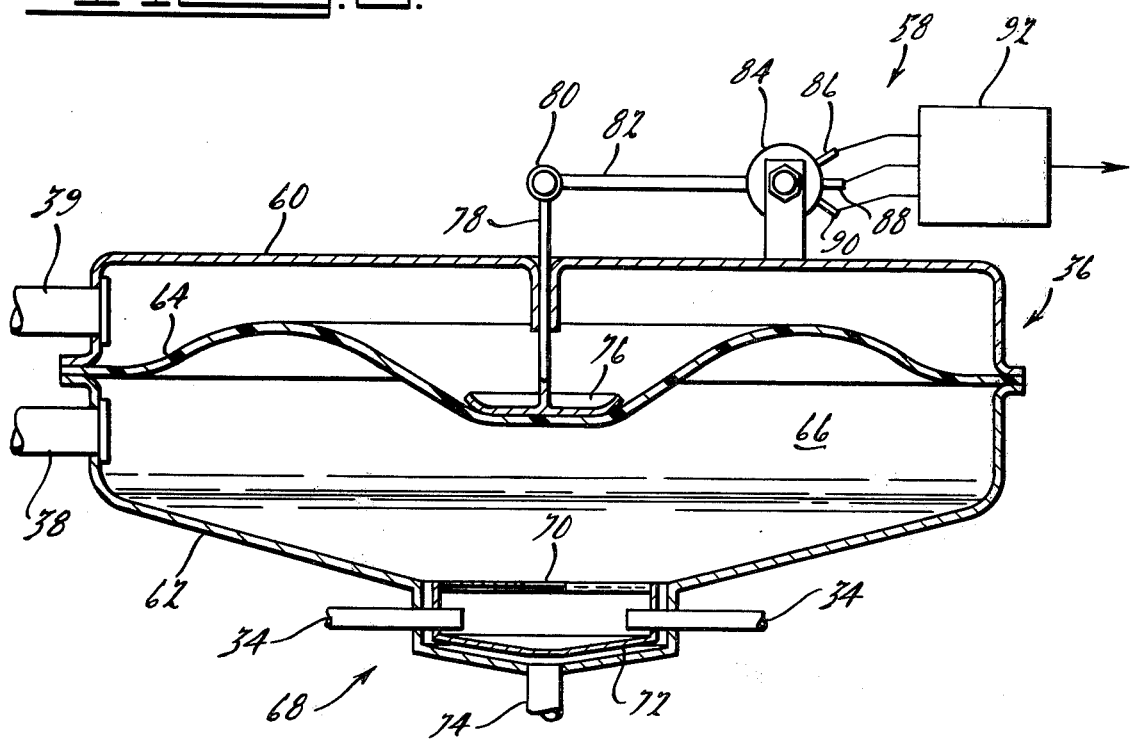
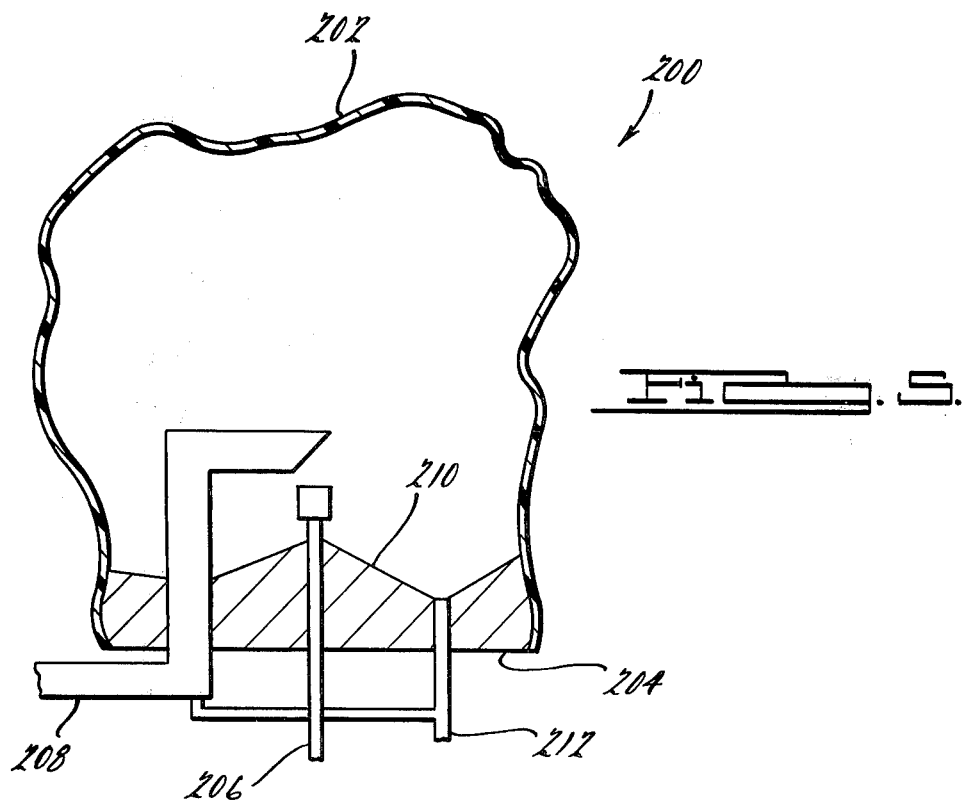

VAPOR TEMPERATURE CONTROLLED EXHAUST GAS HEAT EXCHANGER

This is a division of application Ser. No. 699,004, filed June 21, 1976 now U.S. Pat. No. 4,099,499.

CROSS REFERENCE TO RELATED APPLICATION

This application is related to copending commonly assigned patent application Ser. No. 660,281 filed on February 23, 1976 in the names of J. E. Auiler et al. and titled "Vaporized Liquid Fuel Delivery and Metering Systems".

BACKGROUND OF THE INVENTION

1. Field of the Invention

The present invention is directed to the field of internal combustion engine fuel delivery and metering systems. In particular, the present invention is directed to that portion of the above-noted field which is concerned with the delivery and metering of a liquid fuel to provide a combustible air/fuel mixture for an internal combustion engine. More particularly still, the present invention is directed to that portion of the above-noted field which is concerned with the delivery and metering of a liquid fuel which has been vaporized prior to mixture with an air stream. More particularly still, the present invention is directed to that portion of the above-noted field which is concerned with the vaporization of a liquid fuel in quantities sufficient to maintain the operation of an internal combustion engine in an automotive vehicle environment. More particularly still, the present invention is directed to that portion of the above-noted field which is concerned with the provision of an internal combustion engine waste heat operated liquid fuel vaporizer operative to provide quantities of vaporized liquid fuel sufficient to maintain operation of the internal combustion engine. More particularly still, the present invention is directed to that portion of the above-noted field which is concerned with the provision of an internal combustion engine exhaust gas system situated heat exchanger communicating with a source of liquid fuel and operative, under normal engine operating conditions, to transfer sufficient quantities of heat from the exhaust gas to the liquid fuel within the heat exchanger to provide sufficient quantities of vaporized liquid fuel to sustain engine operation. More particularly still, the present invention is directed to that portion of the above-noted field which is concerned with the provision of means for modulating the temperature of an exhaust gas actuated liquid fuel vaporizer. More particularly still, the present invention is directed to that portion of the above-noted field which is concerned with the provision of a liquid fuel vaporizer positionable within the exhaust gas conduit of an internal combustion engine having means responsive to the temperature of a vaporized liquid fuel to modulate the quantity of exhaust gas being supplied to the liquid fuel vaporizer.

2. Description of the Prior Art

It is well known in the prior art to provide a fuel in liquid form to a moving air stream for delivery to the combustion chambers of an internal combustion engine. The prior art systems generally have utilized mechanical or electromechanical fuel delivery and metering apparatus to provide metered quantities of liquid fuel in proximity to, and in some cases into, the combustion chambers of an internal combustion engine. The prior art has also taught that a quantity of liquid fuel may be added to a quantity of moving air upstream from, and for ultimate delivery to, a plurality of combustion chambers through a plurality of intake manifold conduits. The advent of federally mandated internal combustion engine exhaust emission standards has resulted in the investigation of techniques to substantially reduce the quantity of pollutants produced by an internal combustion engine. One technique proposed to reduce the quantity of atmospheric pollutants generated by an internal combustion engine has been to prevaporize the liquid fuel prior to delivery to the air stream. The basis of this proposal is the improved ability to control, from cylinder-to-cylinder within any one internal combustion engine, the air/fuel ratio of the combustion mixture. Experimental results have indicated that to the extent to which the air/fuel ratio may be controlled more accurately, the ability to implement techniques for the reduction of atmospheric pollutants generated by the internal combustion engine may also be increased.

The prior art contains a substantial number of suggestions directed to the vaporization of a liquid fuel for use in a fuel delivery system for an internal combustion engine. These prior art solutions have generally centered around using the exhaust gases of the internal combustion engine as a source of heat for heating a liquid fuel stream. However, the prior art suggestions have not been wholly technically feasible in terms of providing a vaporized liquid fuel to an internal combustion engine in an automotive environment. In particular, the automotive environment requires that fuel be delivered to the internal combustion engine with mass flow rates which may vary by a factor of twenty to one (20:1). Any liquid fuel vaporizing system must therefore be capable of accommodating vaporization of liquid fuel which may be consumed by the engine with mass flow rates which vary by twenty to one (20:1).

A further problem which has not been adequately addressed by the prior art involves the recognition that commercially available gasolines can be expected to be completely vaporized at temperatures above about 425° F. The temperature of the exhaust gases produced by an internal combustion engine can readily be substantially in excess of this value. It is therefore a specific object of the present invention to provide a liquid fuel vaporization apparatus for insertion within the exhaust gas system of an internal combustion engine which apparatus includes means to vary the temperature of the vaporization apparatus. It is also an object of the present invention to provide liquid fuel vaporization apparatus which is adapted to accommodate vaporization of a liquid fuel having a mass flow rate which may vary by a factor of twenty to one (20:1). In accommodating an engine which may consume masses of fuel which may vary by a substantial margin, the cross referenced copending commonly assigned patent application teaches the use of a variable volume vapor reservoir. It is therefore a further and specific object of the present invention to provide a liquid fuel vaporization apparatus for charging a vapor reservoir.

BRIEF DESCRIPTION OF THE DRAWING

FIG. 3 illustrates the vapor reservoir and vapor volume control means according to the FIG. 1 embodiment in an enlarged, partly sectional, partly diagrammatic view.

FIG. 5 illustrates an alternative embodiment for the vapor reservoir according to FIG. 3.

DETAILED DESCRIPTION OF THE PREFERRED EMBODIMENT

Figure 1:
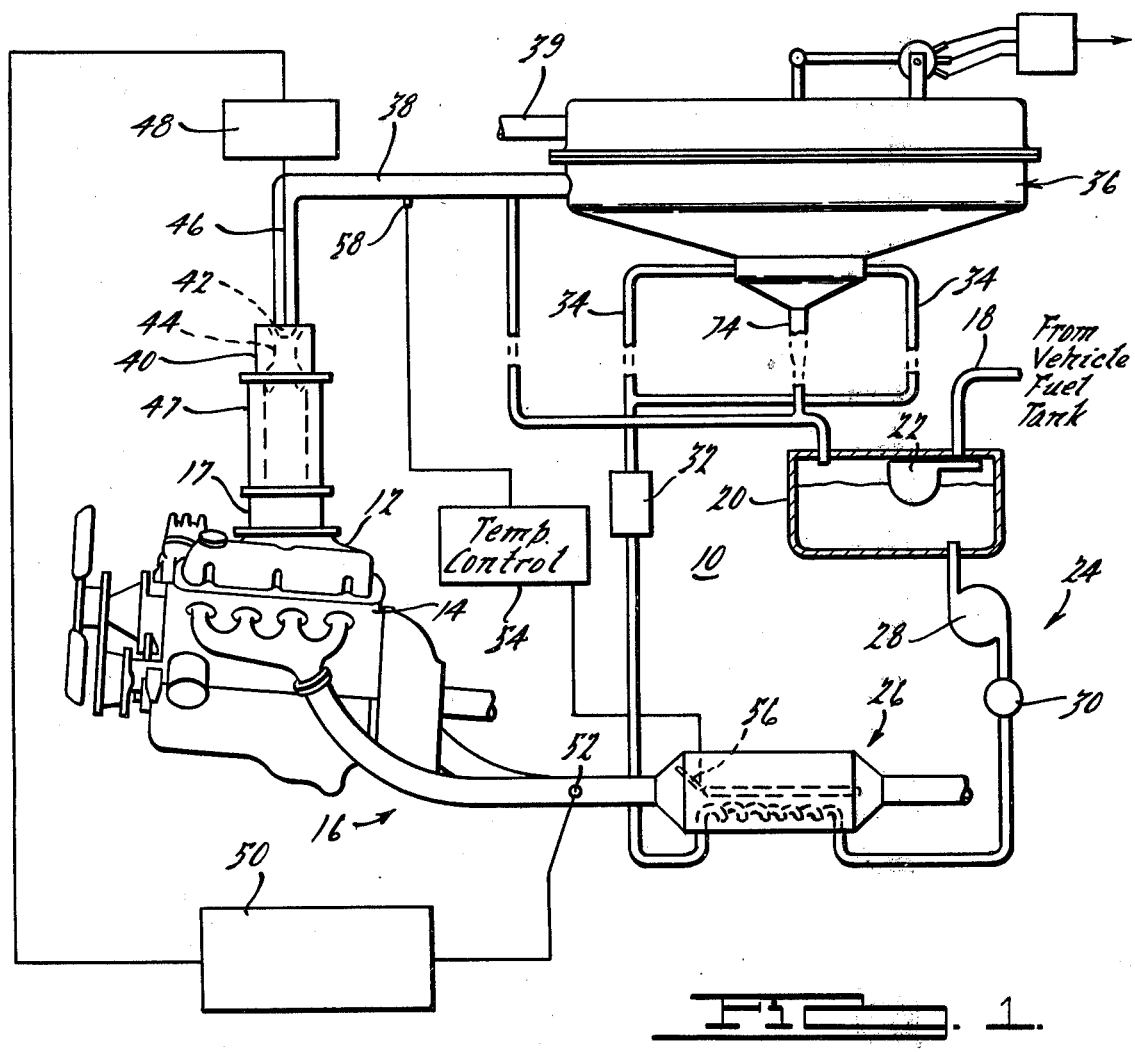
FIG. 1 illustrates a vaporized liquid fuel delivery and metering system with which the present invention is of utility.

Referring now to the drawing wherein like numerals designate like structure throughout the various views thereof, FIG. 1 illustrates a vaporized liquid fuel delivery and metering system 10. The vaporized liquid fuel delivery and metering system 10 is arranged to provide a combustible air/fuel mixture to the intake manifold 12 of an internal combustion engine 14. Internal combustion engine 14 is provided with combustion by-product exhaust gas system or conduit means 16. Intake manifold 12 is provided with throttle body 17. As illustrated, internal combustion engine 14, intake manifold 12, throttle body 17 and exhaust conduit means 16 are substantially conventional. For purposes of illustration, it will be considered that internal combustion engine 14 is of the type adapted for installation and use in powering an automotive vehicle, not shown.

System 10 is arranged to receive liquid fuel from a conventional liquid fuel reservoir or tank, not shown, through conduit 18. Conduit 18 communicates with intermediate liquid fuel reservoir 20. The communication between conduit 18 and intermediate reservoir 20 may be controlled, for example, by a pivoted float valve 22 in the conventional manner. As will be appreciated, liquid fuel could be pumped through conduit 18 by conventional pumping means such as the conventional mechanical or electrical fuel pump normally used in automotive vehicles.

Liquid fuel contained in intermediate reservoir 20 may be provided by coarse liquid fuel delivery means 24 to the primary heating means 26 according to the present invention. Coarse liquid fuel delivery means 24 may include, for example, an electrical or mechanical liquid pump 28 and/or a liquid flow control valve 30. An auxiliary means 32 is arranged in fluid serial flow relationship with respect to the primary heating means 26 so that fuel provided from intermediate reservoir 20 would flow serially through the primary heating means 26 and thence through auxiliary heating means 32. The auxiliary heating means 32 are shown to be communicated via conduits 34 to vapor reservoir 36.

As illustrated in FIG. 1, the primary and auxiliary heating means 26, 32 are connected in serial fluid flow relationship. In order for efficient operation of the auxiliary heating means 32, it should be designed for relatively low fuel flow consonant with operation of the associated engine 14 at idle. As such, however, the auxiliary heating means 32 could present a high impedance to fluid flow and could impede engine operation under high fuel consumption conditions. It is therefore contemplated that the primary and auxiliary heating means could be connected in parallel fluid flow. It is also contemplated to provide a fluid by-pass valve downstream from primary heating means 26 and upstream from the auxiliary heating means 32 to place the primary heating means 26 in direct fluid communication with the vapor reservoir 36 when the auxiliary heating means 32 are not required as a vapor supply source.

Vapor reservoir 36 is communicated by way of conduit 38 with carburetor means 40. As used herein "carburetor" means any device for mixing fuel with air to establish a combustible air/fuel mixture. As illustrated in FIG. 1, the vapor delivery nozzle 42 of vapor delivery conduit 38 is positioned within the low pressure zone formed by the metering venturi means 44 of the carburetor means 40. A movable pintle 46 is situated within the vapor delivery nozzle 42 and is controlled by servomechanism means 48. Carburetor means 40 includes mixing section 47 which intercommunicates the metering venturi means 44 with the throttle body 17 and the intake manifold 12.

Servomechanism 48 may be for example a conventional servometer operated electrically or by electromechanical means. Servomechanism 48 receives an input command signal from servomechanism control means 50. As here illustrated, servomechanism control means 50 are arranged to be responsive to an exhaust gas sensor 52 which may for example, a titania exhaust gas sensor according to U.S. Pat. No. 3,886,785. According to FIG. 1, fuel delivery and metering system 10 is also provided with temperature control means 54. Temperature control means 54 are arranged to be responsive to the vapor temperature in vapor delivery conduit 38 in order to control an exhaust gas flow diverter valve 56 which is described in greater detail hereinbelow with reference to FIG. 2.

Figure 2:
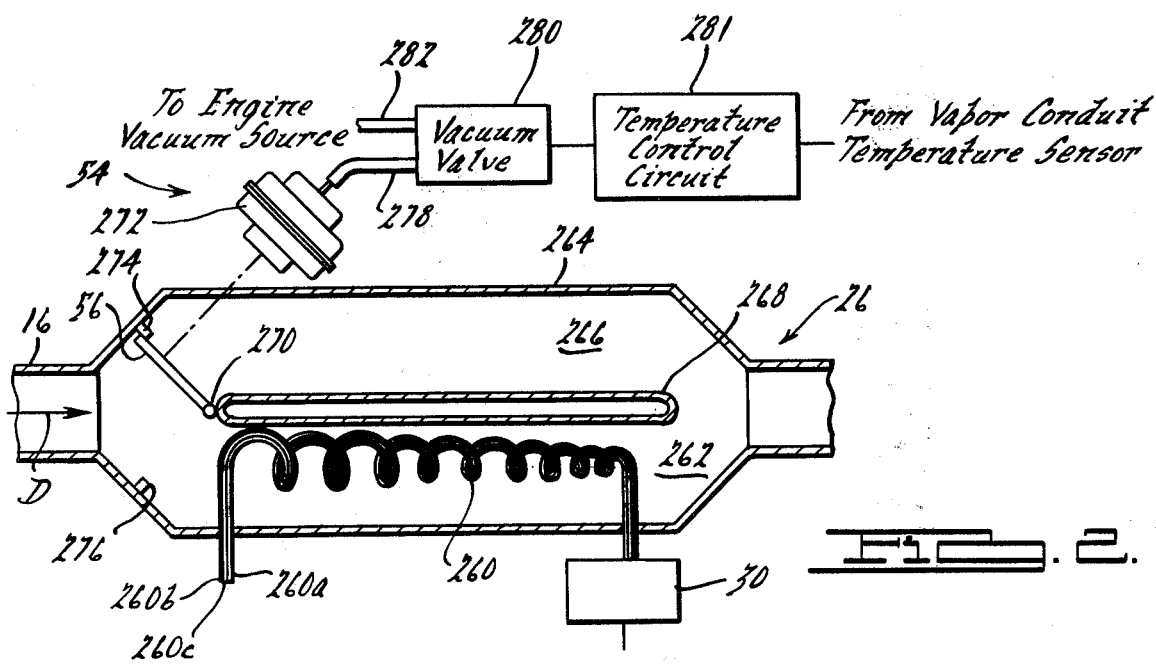
FIG. 2 illustrates the liquid fuel vaporizer according to the present invention in a partly schematic, partly sectional view.

Referring now to FIG. 2, the primary liquid fuel heater means 26 according to the present invention is illustrated in a partly schematic, partly sectional, partly diagrammatic view. Primary heater means 26 comprise a helical coil 260 of fuel conduit which is disposed within heating chamber 262 of a bi-chambered housing 264. Housing 264 is here shown to be formed as a portion of exhaust gas conduit 16. In order to achieve a high surface-to-volume ratio for heat exchanger coil or helix 260, consonant with rapid liquid vaporization of liquid fuel within coil 260, a plurality of fuel conduits 260a, 260b and 260c are shown as being utilized in fabricating heat exchanger coil or helix 260. Each fuel conduit 260a, 260b, 260c is preferably fabricated out of a thin walled material having good heat transfer capability and the ability to withstand the corrosive environment of the exhaust system 16. We have found stainless steel tubing to be suitable. The coil 260 may be formed on a mandrel by any of the well known techniques. The individual conduits 260a, 260b, and 260c are would in side-by-side alignment and may be welded or otherwise bonded together to equalize the temperature gradients between individual coils. Housing portion 264 includes a generally centrally disposed baffle means 268 to define an exhaust gas flow chamber 266 which is separated from the heat exchanger chamber 262.

The flow of exhaust gases, in the direction of arrow D, through heat exchanger chamber 262 within exchanger housing 264 is here controlled by exhaust gas flow diverter valve 56. Exhaust gas flow diverter valve 56 is pivotally connected as at 270 to the central baffle 268 and is positioned in response to the vapor temperature responsive valve control means 54. Temperature responsive valve control means 54 include a conventional vacuum motor means 272, vacuum valve 280 and temperature control circuit means 281.

Exhaust gas flow diverter valve 56 is mechanically linked or coupled to vacuum motor 272. Vacuum motor 272 is operative to pivotally rotate diverter valve 56 between the positions denoted by stops 274, 276 on the side wall of housing 264. Vacuum motor 272 is communicated by vacuum hose 278 to vacuum valve 280. Vacuum valve 280 communicates with source of vacuum through vacuum conduit 282. The vacuum source may conveniently be an appropriate portion of the engine 14. Vacuum valve 280 may be, for example, a solenoid operated valve to selective communicate vacuum motor 272 with a vacuum source in response to electrical signals applied by temperature control circuit means 281. Vacuum valve 280 is responsive to temperature control circuit means 281 to command vacuum motor 272 to actuate exhaust valve 56. By actuating exhaust flow control valve 56 to a position in substantial abutment with stop 276, the flow of exhaust gas will be diverted from passage through chamber 262 which includes heat exchanger coil 260 to passage through chamber 266. Temperature control circuit means 281 may be arranged to be responsive to a thermistor 58. Thermistor 58 may be located, for example, within vapor conduit 38. Alternatively, thermistor 58 could be in thermal exchange contact with the vapor within vapor reservoir 36 or with any other convenient structural member having a temperature which is indicative of the temperature of the vapor within the vapor delivery portion of the fuel delivery and metering system 10.

By way of example, temperature responsive circuit means 281 may include an electrical bridge circuit which includes, as a portion thereof, the thermistor 58 and an electronic comparator circuit to establish the minimum desired vapor temperature. Such circuits are well known in the art. As thus described, vacuum motor 272 and exhaust diverter valve 56 may be cooperative to cause substantially all of the exhaust gas flow to pass through the chamber 262 and hence over heat exchanger coil 260 or to pass through by-pass chamber 266. With the diverter valve 56 in an intermediate position, a portion of the exhaust flow may pass through each chamber. Since placement of the diverter valve 56 in the extreme positions could ordinarily be expected to result in substantial temperature variation of the vapor being provided to vapor reservoir 36, the thermal inertia of the heat exchanger coil 260, the central baffle 268 and the thermal coupling between the two chambers of the housing may be selected to give adequate temperature smoothing commensurate with acceptable heat exchanger warm-up and good transient response times.

We have found that good results can be obtained with a primary heater means 26 according to the present invention having a fuel volume within the vaporizer section, coil 260, of about one percent (1%) of the displacement of the associated engine. We have also found that sufficient heat will be present within chamber 262 after about twenty (20) seconds of engine operation (at an ambient temperature of about 70° F.) to fully vaporize liquid fuel flowing through fuel conduits 260a, 260b, 260c. It will be appreciated that heat-up time will be, at least in part, a function of the proximity of the primary heating means 26 to the engine 14 and the ambient temperature.

Referring now to FIG. 3, the vapor reservoir 36 and its associated vapor pressure control means 58 are illustrated. Vapor reservoir 36 is comprised of a canister or housing having upper and lower housing sections 60, 62, respectively. A movable wall member 64 is sealingly confined between extending flanges of the upper and lower canister housing sections 60, 62 to define a vapor tight vapor space or storage zone 66. Movable wall means 64 may be formed as a diaphragm member and may be fabricated from any suitable, flexible, high temperature and vapor resistant material. Movable wall means 64 may be, for example, in the case of vaporized liquid gasoline, a polytetrafluoroethylene (PTFE) material. Other materials are known and can be used. PTFE material has a maximum operating temperature in the contemplated environment of about 600° F. while commercially available gasoline may be expected to be completely vaporized at temperatures not exceeding 450° F. A suitable thickness for such a diaphragm member has been found to be 2 mils. smaller thicknesses are also suitable, provided that manufacturing induced defects as perforations are avoided.

Lower canister housing section 62 is provided with a downwardly extending vapor inlet and condensate collection section 68. Vapor delivery conduits 34 are arranged to direct a vapor stream into the interior of section 68 where the vapor may communicate through swirl fins 70 with the vapor storage zone 66. A shield member 72 is received within section 68 and is attached to and supported by vapor inlet tubes 34. Condensate collection section 68 is provided with a generally downwardly extending generally conical and plate member having condensate collection conduit 74 affixed thereto at its lowest point. Shield member 72 is arranged to be spaced away from the walls of condensate collection section 68 and to be thermally floating with respect to the lower housing member 62 and the condensate collection section 68. Shield member 72 is arranged to provide a barrier between the relatively high temperature inlet vapor and the lower temperature condensate collection section 68 and any condensed fuel which may be accumulated therein. Preferably, shield member 72 is fabricated out of a low thermal inertia material such as a thin stainless steel or suitable ceramic. Swirl fins 70 promote intermixing of the higher temperature inlet vapor with any vapor residual within vapor zone 66 to encourage relatively uniform temperature distribution within zone 66. In operation, any vaporized fuel which would condense due to contact with a low temperature surface within the vapor reservoir 36, and particularly the less volatile fractions of gasoline, would be collected within section 68 and would flow through condensate return conduit 74 for return to the intermediate tank 20.

The central portion of movable wall means 64 is connected to plate member 76. Plate member 76 is connected to movable position sensing rod 78. Position sensing rod 78 is pivotally connected at pivot 80 to lever arm 82 of rheostat member 84. Rheostat member or potentiometer 84 is provided with three electrical terminals 86, 88 and 90 which communicate with the vapor volume control means 92.

Vapor region 66 communicates with the engine 14 through vapor conduit 38. Reference conduit 39 communicates the upper housing section 60 and particularly the nonvapor surface of movable wall means 64 with the source of air being utilized by internal combustion engine 14. In those instances where the air being ingested by engine 14 passes through an air cleaner, conduit 39 would preferably communicate with the interior of the air cleaner. In those instances where atmospheric air is provided directly to internal combustion engine 14, reference conduit 39 would communicate directly to the atmosphere. Reference conduit 39 thus provides the nonvapor side of movable wall portion 64 with a pressure reference which is substantially identically equal to the pressure of the air being provided to, and immediately upstream from, carburetor means 40.

Figure 4:
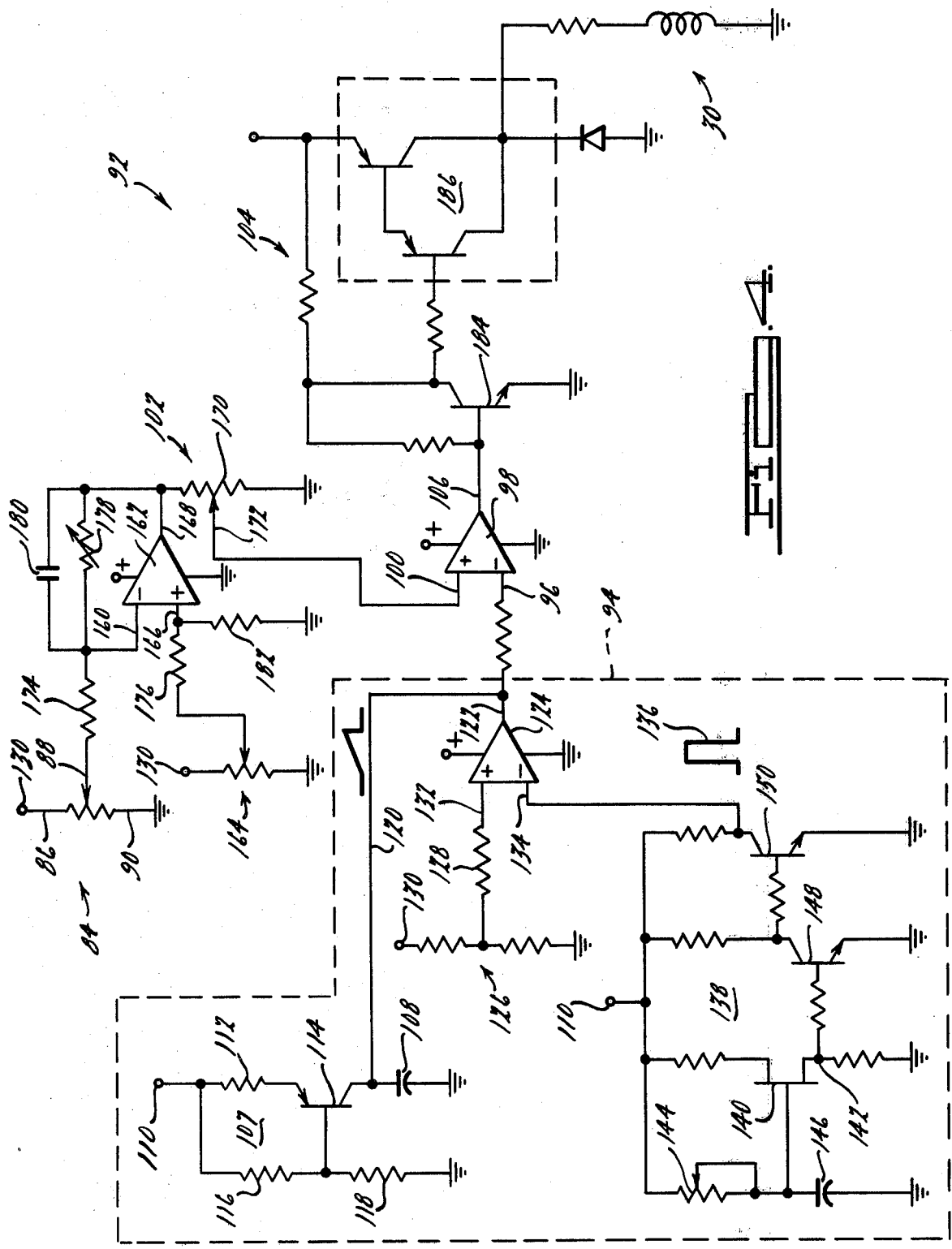
FIG. 4 illustrates the electrical control circuit for maintaining a desired vapor volume in the vapor reservoir.

Referring now to FIG. 4, the vapor volume control means 92 of FIG. 3 is illustrated as an electronic circuit. Vapor volume control means 92 is adapted to control valve 30 of coarse pumping and valving means 24 in response to the quantity of vapor within vapor region 66 as indicated by potentiometer 84. In the presently preferred embodiment of the vaporized liquid fuel system according to the present invention, coarse fuel metering valve 30 is a commercially available electrically controlled injection valve used, for example, in electronic fuel injection systems. Such valves are designed and intended to deliver a metered quantity of liquid fuel to the intake manifold of an internal combustion engine in proximity to an intake valve. It will be appreciated that a coarse fuel metering pump 28 could be similarly controlled. Vapor volume control circuit 92 includes a first circuit portion, contained within dashed line 94, for generating a saw tooth wave form for application to one input terminal 96 of a comparator 98. The other input terminal 100 of comparator 98 is arranged to receive a variable voltage signal from control circuitry 102. This variable level voltage signal is generated in response to potentiometer 84. Valve control circuitry 104 is responsive to the output signal from comparator 98 appearing at output terminal 106 to selectively energize the coarse fuel metering valve 30.

Saw tooth generator 94 includes a ramp generator portion 107 which is operative to generate a linearly increasing voltage across capacitor 108. Capacitor 108 is charged by current flow from the terminal 110 through resistor 112 and transistor 114. Transistor 114 is held in an "on" or conductive condition by the voltage divider comprised of a pair of resistances 116, 118, which may be, for example, of the same resistance value. Resistances 116, 118 are operative to apply a reduced voltage such is approximately one-half of the input voltage to the base terminal of transistor 114. Transistor 114 will be conductive and will charge capacitor 108 whenever the voltage on the base terminal exceeds the voltage on the collector terminal and is less than the voltage on the emitter terminal. The rate of change of capacitor 108 can be controlled by the magnitude of resistance 112.

Capacitor 108 intercommunicates the collector of transistor 114 to ground. The other or nonground side of capacitor 108 is communicated by conductor 120 to output terminal 122 of transistorized gate circuit 124. One input terminal of transistorized gate circuit 124 is provided with a constant voltage signal derived from a conventional voltage divider 126 through resistance 128. Voltage divider 126 is connected electrically between terminal 130 and the ground and is operative to provide a constant voltage signal at input terminal 132. For purposes of this circuit description, voltage terminal 110 may be considered to represent a first level of voltage and voltage terminal 130 may be considered to represent a second level of voltage with all similarly designated terminals being in electrical communication with the same voltage source. Transistor 114 is arranged to act as a constant current source in charging capacitor 108. The voltage across capacitor 108 will increase substantially linearly until a value is reached which would reverse bias the base-collector junction of transistor 108 causing the transistor to switch off.

Input terminal 134 of transistorized gate circuit 124 receives a periodically repeated voltage pulse signal, such as at 136, which is generated by oscillator circuit 138. Oscillator circuit 138 is electrically energized from a voltage terminal 110. Oscillator circuit 138 is operative to generate a voltage pulse which goes from substantially the ground level to substantially the value of the source voltage and has a very narrow pulse width. The occurrence at input terminal 134 of a pulse having a voltage value which is in excess of the voltage value of the generally constantly applied voltage appearing at terminal 132 will be operative to cause the output of transistorized gate circuit 124 to approach ground value. This will impose a substantially ground voltage on conductor 120 to thereby discharge capacitor 108. Removal of the pulse from input terminal 134 will allow capacitor 108 to recharge. Thus, a saw tooth voltage signal going from a near ground or zero value to a maximum or full value voltage will be applied to terminal 96 of comparator 98. The pulse width of the output signal generated at output terminal 106 by comparator 98 will then be a function of the voltage appearing on input terminal 100.

The oscillator circuit 138 includes unijunction transistor 140 and associated circuitry operative to generate a pulse train at circuit junction 142. The associated circuitry includes variable resistance 144 and capacitor 146 arranged in an RC network and operative to periodically charge and discharge the capacitor 146 to cause breakdown of the unijunction transistor 140. The pulses appearing at circuit junction 142 may be shaped by additional circuitry associated with transistors 148, 150 to establish the pulse train of pulses 136 having a generally uniform pulse width with rapid rise and fall. Resistance 144 is here shown to be variable in order to vary the frequency of the resulting pulse train. We have found that a pulse frequency of 50 Hz and a pulse width of 0.1 $\mu$sec. gives good results.

The potentiometer 84 is connected by its terminals 86, 90 between a voltage terminal, such as terminal 130, and ground. The slider 88 of potentiometer 84 is coupled to the movable wall member 64 of vapor reservoir 36 as described hereinabove with reference to FIG. 3. The voltage developed by potentiometer 84 at slider 88 is therefore a function of the position of the movable wall member 64 and hence of the quantity of vapor within the vapor region 66. This voltage is applied to one input terminal 160 of comparator 162 to be compared with a reference voltage applied at input terminal 166. The reference voltage is developed by potentiometer 164. Comparator 162 is arranged to provide an output signal at output terminal 168 which signal represents the difference between the applied input signals. The output signal appearing at output terminal 168 is applied through potentiometer 170 to the input terminal 100 of comparator 98.

The input terminals 160, 166 of comparator 162 are provided with input resistances 174, 176 respectively. In addition, variable feedback resistance 178 and capacitor 180 are arranged electrically in parallel interconnecting input terminal 160 with output terminal 168. The ratio of the resistance of feedback resistance 178 compared with the resistance of input resistance 174 will establish the gain of the comparator and the gain so established can be expected to be stable in extended use. Capacitor 180 is selected to prevent relatively high frequency variations in the voltage appearing at output terminal 168. This is desirable to prevent a relatively high frequency instability in the closed loop which includes the "mechanical" elements of the primary heater means 26 and the vapor reservoir 36. For good d.c. stability, the values of resistance of the input resistances 174, 176 are selected to be substantially equal. The value of the grounding resistance 182 is also selected to be approximately equal to the value of the feedback resistance 178 for good d.c. stability.

With potentiometer 84 disconnected, potentiometer 164 is adjusted to make the voltage at output terminal 168 sufficiently high to just provide maximum fuel delivery to the primary heater means 26. Potentiometer 84 is then connected and adjusted so that the voltage at output terminal 168 is as previously set. Feedback resistance 178 is then adjusted to give a zero output voltage at output terminal 168, corresponding to the vapor reservoir being filled, by holding the vapor reservoir movable wall portion in an up or "filled" condition. As illustrated in FIG. 3, a depleted vapor supply in reservoir 36 will cause the voltage appearing at input terminal 160 to decrease. The voltage appearing at output terminal 168 is arranged to increase as the voltage at input terminal 160 decreases from the reference level established by potentiometer 164.

Potentiometer 170 is connected between output terminal 168 and ground. The slider 172 of potentiometer 170 is connected to the input terminal 100 of comparator 98. The slider 172 may also be connected to the apparatus controlling the position of the throttle valve within throttle valve body 17. For example, a closed throttle condition would cause the slider to reduce the level of the voltage signal applied to input terminal 100. This arrangement will operate to vary the effective gain of comparator 162 in response to actual operation of internal combustion engine 14 to assist in filling the vapor reservoir when the throttle valve of the engine is opened and to assist in preventing excess vapor formation when the throttle valve is moved toward a closed position. Potentiometer 170 will also assist in preventing relatively low frequency instability in the loop which includes primary heater means 26 and vapor reservoir 36.

Comparator 98 is arranged to generate an output voltage signal at output terminal 106 whenever the voltage appearing on input terminal 96 is below the level of voltage established at the input terminal 100. Thus, with a saw tooth input signal at input terminal 96, a pulse train of rectangular pulses will be generated at output terminal 106 with a frequency equal to the frequency of the saw tooth wave train and a pulse width determined by the portion of any particular saw tooth pulse which is below the threshold voltage. The output signal will be applied to output transistor 184 which will invert the signal to apply an input to the power amplifier circuitry 186 to control energization of the coarse fuel metering valve 30. Thus, when vapor reservoir 36 is full, the threshold signal will be substantially zero and the output signal at terminal 106 will be substantially constant at the zero level. This will turn output transistor 184 "off" thereby applying a high voltage signal to power amplifier 186 causing power amplifier 186 to be "off". This will result in closing coarse fuel metering valve 30 and terminating fuel delivery to the primary heating means 26. As the vapor is depleted from vapor reservoir 36, the threshold signal will rise causing the output signal to appear as a train of pulses at the saw tooth frequency. The pulse portion of the output signal pulse train will switch output transistor 184 "on" and will cause the power amplifier 186 to be "on" to energize coarse fuel metering valve 30. With valve 30 on or open, additional quantities of fuel will be allowed to flow to the primary heater means 26 for vaporization thereby. For very low volumes of vapor in vapor reservoir 36, the threshold signal will be high and the pulse width will increase thereby increasing the "on" time of power amplifier 186 and the open time of coarse fuel metering valve 30.

Referring now to FIG. 5, an alternative vapor reservoir 200 is shown. Vapor reservoir 200 includes a collapsible envelope comprised of the thin membrane of plastic material 202 which is sealingly attached to base plate member 204. Base plate member 204 may be provided with an inlet source 206 of vaporized liquid fuel and a vapor conduit 208 communicating the interior of the reservoir 200 with the internal combustion engine, not shown. Vapor conduit 208 is shown as having its inlet orifice arranged in the central portion of envelope 202. The inlet orifice of inlet 206 is preferably downwardly directed to promote thermal mixing. Base plate 204 is provided with a condensate collection depression 210 which communicates with condensate return conduits 212. In order to drain condensate from the vapor conduit 208, the condensate return conduit 212 also communicates with vapor conduit 208.

We claim:

1. An exhaust gas heat exchanger for inclusion in the exhaust gas conduit system of an automotive internal combustion engine, comprising in combination:

housing means having an exhaust gas inlet port and an exhaust gas outlet port;

baffle means received within said housing means operative to partition the interior of said housing means into at least two chambers, said chambers being arranged for parallel exhaust flow communication between said inlet port and said outlet port;

heat exchanger coil means received within one of said chambers and arranged for conveyance of a fluid;

diverter valve means within said housing in proximity to said inlet port and operable to direct exhaust gas passing through said inlet port to flow to said outlet port substantially through a selected one of said chambers;

valve control means for controlling the position of said diverter valve means;

said heat exchanger coil means being arranged for conveyance of a fluid fuel which is a liquid under standard temperature and pressure conditions and which may be vaporized by heating and said valve control means including temperature responsive means arranged to be responsive to the fluid fuel temperature at a selected fluid fuel location for controlling the application of exhaust gas heat to said coil means, said selected liquid fuel location is downstream, in the fluid conveyance direction, from the heat exchanger coil means; and said valve control means further include vacuum motor means communicable to a vacuum source and communicating with said temperature responsive means operative to provide diverter valve means positioning.

2. A liquid fuel vaporizer including an exhaust gas heat exchanger for inclusion in the exhaust gas conduit system of an internal combustion engine, comprising in combination:

a liquid fuel reservoir means for storing liquid fuel;

housing means having an exhaust gas inlet port and an exhaust gas outlet port;

baffle means received within said housing means operative to partition the interior of said housing means into at least two chambers, said chambers being arranged for parallel exhaust gas flow communication between said inlet port and said outlet port;

heat exchanger coil means received within one of said chambers and arranged for conveyance of a fluid fuel for the internal combustion engine;

diverter valve means within said housing in proximity to said inlet port and operable to direct exhaust gas passing through said inlet port to flow to said outlet port substantially through a selected one of said chambers, said diverter valve means being movable between at least a first position and a second position whereby in said first position substantially all of the exhaust gas flow is in a first of said at least two chambers and in said second position substantially all of the exhaust gas flow is in a second of said at least two chambers;

valve control means for controlling the position of said diverter valve means;

a first conduit means for carrying fuel for the internal combustion engine to said heat exchanger coil means;

a fuel vapor storage means for providing a means of containing fuel vapors for use in the internal combustion system, said fuel vapor storage means being in communication with said heat exchanger coil means;

fuel temperature sensing means for sensing the temperature of the fuel at a location downstream in the direction of fuel flow from said heat exchanger coil means;

fuel vapor quantity sensing means for sensing the quantity of fuel vapor resident in said fuel vapor storage means;

a second conduit means for carrying the fuel from said heat exchanger coil to said fuel vapor storage means;

a heat exchanger transfer rate modulating means for modulating the heat exchange transfer rate between the fuel flow and the exhaust gas flow in response to sensed vapor quantity in said fuel vapor storage means whereby the quantity of fuel vapor within said vapor storage means may be maintained within a desired range; and said heat exchange transfer rate modulating means including a flow control means for modulating the rate of delivery of liquid fuel to said heat exchanger coil means.

3. The liquid fuel vaporizer as recited in claim 2 wherein said heat exchanger coil means is arranged for conveyance of a fluid fuel which is a liquid under standard temperature and pressure conditions and which may be vaporized by heating and said valve control means include temperature responsive means arranged to be responsive to the fluid fuel temperature at a selected fluid fuel location for controlling the application of exhaust gas heat to said coil means, thereby modulating the heat exchange transfer rate at said heat exchanger coil means in response to the sensed temperature of a generated fuel vapor may be maintained within a desired range;

said selected liquid fuel location is downstream, in the fluid conveyance direction, from said heat exchanger coil means; and said valve control means further include vacuum motor means adapted to be communicable to a vacuum source and communicating with said temperature responsive means operative to provide diverter valve means positioning.

* * * * *